(12) United States Patent
Pichaimurthy et al.

(10) Patent No.: US 12,282,426 B2
(45) Date of Patent: Apr. 22, 2025

(54) METHODS AND SYSTEMS FOR CACHING CONTENT ITEMS

(71) Applicant: Adeia Guides Inc., San Jose, CA (US)

(72) Inventors: Rajendran Pichaimurthy, Karnataka (IN); Dolphin Masilamany Santha, Karnataka (IN); Daina Emmanuel, Karnataka (IN); Prakash Viswanathan, Karnataka (IN); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 229 days.

(21) Appl. No.: 17/889,559

(22) Filed: Aug. 17, 2022

(65) Prior Publication Data

US 2024/0061776 A1 Feb. 22, 2024

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 5,813,008 | A  * | 9/1998 | Benson | G06Q 10/107 |
| 11,829,251 | B2 * | 11/2023 | Vijayan | G06F 11/1469 |
| 2019/0012091 | A1 * | 1/2019 | Floyd | G06F 16/1748 |
| 2022/0237372 | A1 | 7/2022 | Chakrapani et al. | |
| 2022/0382642 | A1 * | 12/2022 | Bhanjois | G06F 11/1451 |

OTHER PUBLICATIONS

Dagnaw, G., "dCACH: Content Aware Clustered and Hierarchical Distributed Deduplication", Journal of Software Engineering and Applications, 12(11): 460-490 (2019).
Koller, R., et a., "I/O Deduplication", ACM Transactions on Storage, Association for Computing Machinery, 6(3): 1-26 (2010).

* cited by examiner

*Primary Examiner* — David E Martinez
(74) *Attorney, Agent, or Firm* — Haley Guiliano LLP

(57) ABSTRACT

Systems and methods are described for caching content items. At least first and second content items are stored in a cache. A determination is made as to whether there is common content between the first content item and the second content item. In response to determining that there is common content between the first content item and the second content item, at least a portion of one of the first content item and the second content item is deleted. A request for the common content is received. In response to receiving the request for the common content, the common content is retrieved from the other of the first content item and the second content item.

18 Claims, 6 Drawing Sheets

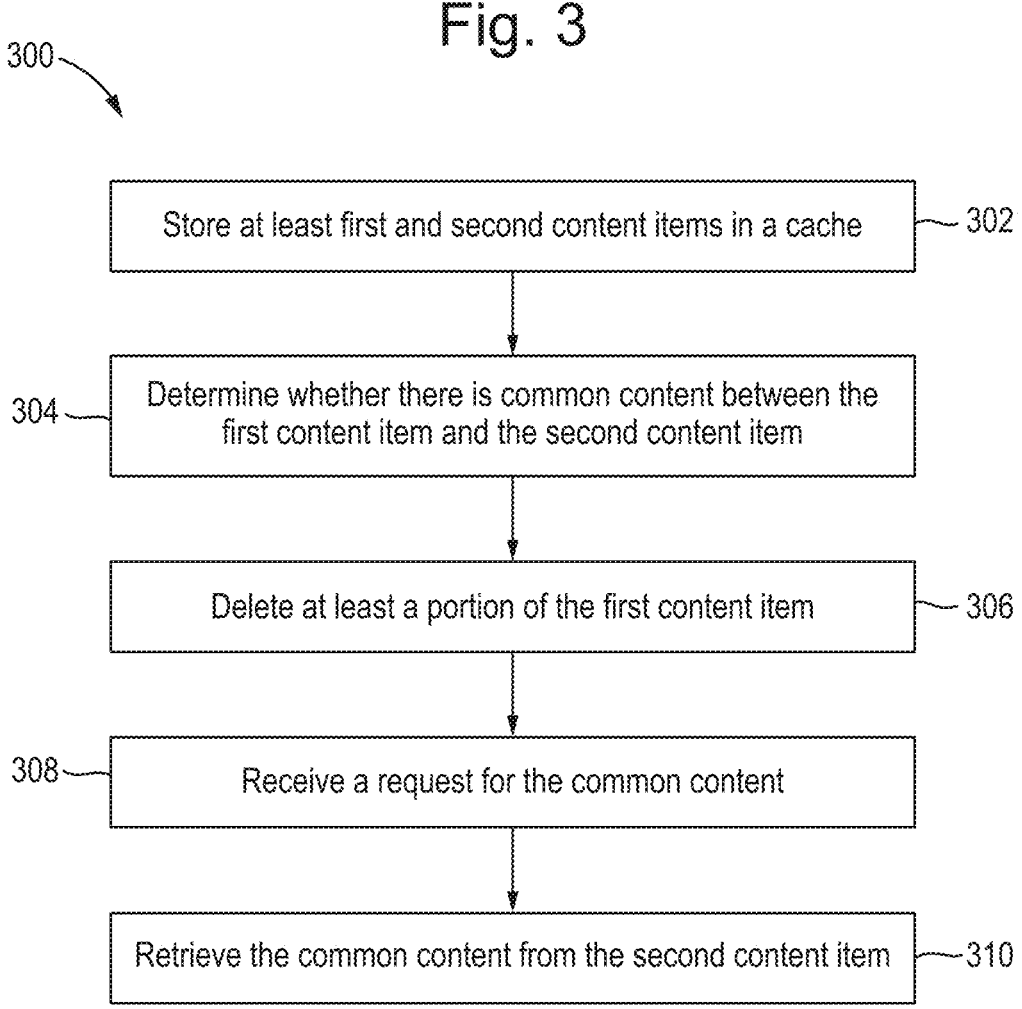

METHODS AND SYSTEMS FOR CACHING CONTENT ITEMS

BACKGROUND

The present disclosure relates to methods and systems for caching content items. Particularly, but not exclusively, the present disclosure relates to storage management and content delivery optimization over a content delivery network, e.g., by identifying, deleting and providing access to duplicated content in a cache.

SUMMARY

A content delivery network (CDN) relies on one or more edge caches to serve content faster to a client device. In general, an edge cache may be distributed over multiple edge servers that are closer to a client device than an original server. Typically, content (e.g., popular content) is stored in a cache (e.g., for a certain period), and some content might not get cached at all. In some cases, an edge cache might store multiple versions of a portion of a media content item. For example, an edge cache might store various versions of a movie, such as theatrical and director cuts, and, separately, popular or deleted scenes from the movie, or a movie soundtrack in addition to the other movie content. As such, it is desirable to optimize storage on the edge cache.

Systems and methods are provided herein for optimizing storage of content in a cache by removing the common content of stored content items. Such systems and methods may provide an improved CDN by increasing the variety of content stored in the cache, thereby sending fewer requests to an origin server and enabling a user device to access content in a more efficient manner.

According to some examples, methods and systems are provided for caching content items across one or more edge servers in a CDN. For example, at least first and second content items are stored in a cache. A determination is made as to whether there is common content between the first content item and the second content item. In response to determining that there is common content between the first content item and the second content item, at least a portion of one of the first content item or the second content item is deleted from the cache (e.g., the common content is deleted from one of the first content item or the second content item). In response to receiving the request for the common content (e.g., a request for the common content deleted from one of the first content item or the second content item), the common content is retrieved from the other of the first content item or the second content item.

In some examples, the first content item has a first identifier for retrieving at least a portion of the first content item from the cache and the second content item has a second identifier for retrieving at least a portion of the second content item from the cache. In some examples, in response to determining that there is common content between the first content item and the second content item, the first identifier is assigned to the second content item for retrieving the common content from the second content item or the second identifier is assigned to the first content item for retrieving the common content from the first content item. The system assigns these identifiers depending on from which content item the common content is deleted. In some examples, in response to deleting at least a portion from the first content item, the first identifier is assigned to the second content item for retrieving the common content from the second content item. In some examples, in response to deleting at least a portion from the second content item, the second identifier is assigned to the first content item for retrieving the common content from the first content item.

In some examples, determining whether there is common content between the first content item and the second content item comprises determining content item information relating to the first and second content items. In some examples, determining whether there is common content between the first content item and the second content item comprises storing the content item information in a database. In some examples, determining whether there is common content between the first content item and the second content item comprises comparing content item information for the first content item to content item information for the second content item.

In some examples, viewing analytics may be determined for the first and second content items. In some examples, the viewing analytics comprise one or more factors (e.g., popularity of a content item, and/or a frequency of access to a content item stored in the cache). For example, determining the viewing analytics may comprise determining a user rating for one or more content items and/or determining when the content item was last accessed. In response to determining that the viewing analytics for the first and second content items comprise a factor that is greater than a threshold (e.g., popularity threshold), the content item information relating to the first and second content items may be determined. In some examples, the content item information comprises content item metadata and/or one or more fingerprints of the content item.

In some examples, a quality of each of the first and second content items is determined. In some examples, at least the portion of the first content item is deleted in response to determining that the quality of the first content item is less than the quality of the second content item. In some examples, at least the portion of the second content item is deleted in response to determining that the quality of the second content item is less than the quality of the first content item. In some examples, at least the portion of the first content item or the second content item is deleted based on a difference in quality between the first content item and the second content item being greater than a quality difference threshold.

In some examples, the common content comprises multiple frames, segments, and/or scenes distributed through each of the first and second content items.

In some examples, a manifest is created for retrieving the common content from one of the first content item or the second content item, in response to deleting the common content from the other of the first content item or the second content item.

In some examples, in response to determining that there is common content between the first content item and the second content item, a temporary content item is generated corresponding to the common content between the first content item and the second content item. The temporary content item may be compared to the common content in the first content item and the second content item. In response to determining that the temporary content item matches the common content of one of the first content item or the second content item, the common content is deleted from the other of first content item or the second content item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 is a flowchart representing a process for caching content items, in accordance with some examples of the disclosure;

FIG. 4A illustrates table comprising data relating to content items stored in a cache, in accordance with some examples of the disclosure;

DETAILED DESCRIPTION

Figure 1:
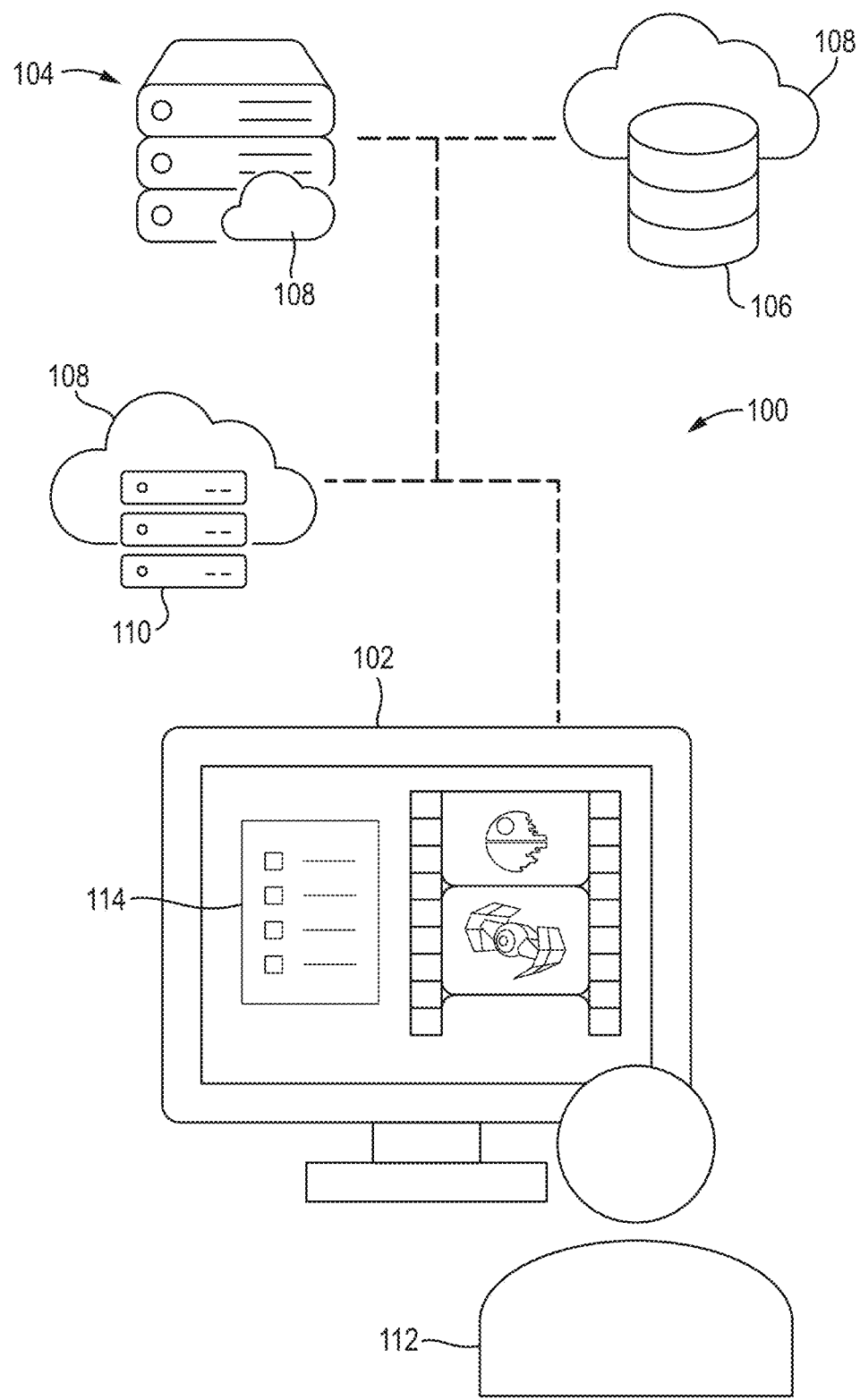
FIG. 1 illustrates overview of the system for viewing media content items, in accordance with some examples of the disclosure.

FIG. 1 illustrates an overview of a system 100 for viewing media content items over a CDN. In particular, the example shown in FIG. 1 illustrates a user device 102 communicatively coupled to an origin server 104 and a content item database 106, e.g., via network 108. In this manner, user device 102 may receive media content on demand, e.g., directly from origin server 104. Additionally, user device 102 is communicatively coupled to an edge server 110, from which user device 102 may receive cached media content. For example, user device 102 may issue a request for a media content item to edge server 110. When a response to the request is present in the cache of edge server 110, a trip to origin server 104 can be avoided (which is normally referred to as a cache hit). Typically, edge server 110 uses on a unique identifier for a file or object in cache (e.g., a cache key) to look up the content. A cache miss occurs when a response to the request is not present in the cache, which may happen when the content is requested for the first time, or if the CDN does not support "cache prewarming" (i.e., storing content in the cache before it is even requested). In some examples, during a cache miss, edge server 110 may try to get the requested content from another cache (not shown) in the CDN (or even a different CDN). In this case a cache-to-cache fill may be performed if the content is indeed available at the other cache (i.e., tiered cache hierarchies). If the requested content is not present in another cache, the request will go to origin server 104, and the response is cached, e.g., in edge server 110, to fulfill future requests for the content. In some examples, a partial cache hit may occur, when a part of the response to the request is cached (typically for byte-range requests).

In a conventional CDN facilitating video-on-demand (VOD), it is common for multiple versions of the same or similar content to be stored in a cache. This can occur when the cache stores a full version of a movie as well as additional content relating to the movie, such as a soundtrack to the movie, or a compilation of certain scenes from a movie, such as scenes that are popular with a viewing community. In the example shown in FIG. 1, user 112 is operating user device 102, which is configured to run a media guidance application for accessing content on edge server 110 and origin server 104. For example, the media guidance application may be configured to display a guide (e.g., list 114), which allows user 112 to select various versions of a media content item (such as a theatrical cut and a director's cut of a movie), and/or various scenes from that media content item, such as action scenes and/or scenes that are trending with a viewing community. As a result, in a conventional system, some of the content items stored in the cache, e.g., on edge server 110, may be duplicated, which can result in sub-optimal storage of content on edge server 110 and unnecessary requests being sent to origin server 104. The present disclosure, as discussed in detail below, provides improved systems and methods for storing and accessing content in a CDN. For example, storage requirements may be optimized by identifying and deleting duplicated content on edge server 110. In particular, when duplicated content is identified and deleted, access to that content is maintained without requiring user device 102 to access origin server 104 to retrieve the deleted content. Furthermore, since storage capacity is increased owing to the deletion of duplicated content, a larger variety of content can be stored on edge server 110.

In the example shown in FIG. 1, system 100 includes at least one user device 102, such as a tablet computer, a smartphone, a smart television, or the like, configured to display or otherwise provide, e.g., aurally, media content to one or more respective users. System 100 may also include network 108 such as the Internet, configured to communicatively couple user devices 102 to one or more servers 104, 110 and/or one or more content databases 106 from which media content, such as music, TV shows, movies and/or advertisement content, may be obtained for display on the user devices 102. User device 102 and the one or more servers 104, 110 may be communicatively coupled to one another by way of network 108, and the one or more servers 104, 110 may be communicatively coupled to content database 106 by way of one or more communication paths, such as a proprietary communication path and/or network 108. In some examples, servers 104 and 110 may be servers of (or operated by) a service provider who provides media content for display on user device 102.

In some examples, system 100 may comprise an application that provides guidance through an interface, e.g., a graphical user interface, that allows users to efficiently navigate media content selections, navigate an interactive media content item, and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on a user profile and/or an endorsement profile of the content item. For example, the application may provide a user with a recommendation based for a content item based on one or more endorsements present, e.g., visibly and/or audibly present, in the content item. In some examples, the application provides users with access to a group watching session and/or group communication functionality. For example, the application may provide a user with an option to join a group watching session and participate in group communication with one or more other users participating in the group watching session.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media content items", "media asset", "content items" and "content" should each be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "computing device," "electronic device," "electronic equipment," "media equipment device," or "media device" should be understood to mean any device for accessing the content described above, such as a television, a Smart TV, a set-top box, an integrated receiver decoder (IIID) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
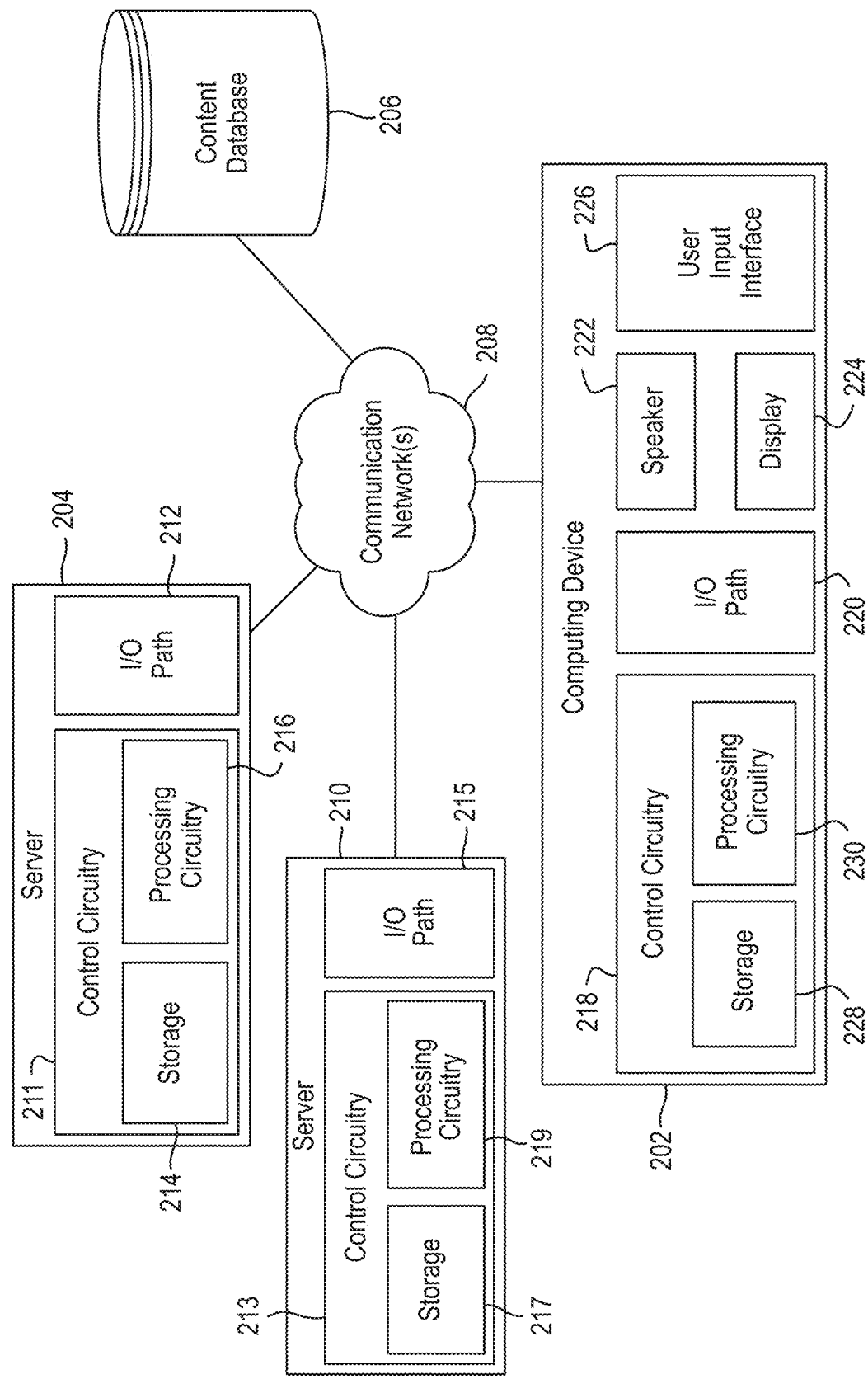
FIG. 2 is a block diagram showing components of an example system for operating a group watching session, in accordance with some examples of the disclosure.

FIG. 2 is an illustrative block diagram showing example system 200 configured to display media content. Although FIG. 2 shows system 200 as including a number and configuration of individual components, in some examples, any number of the components of system 200 may be combined and/or integrated as one device, e.g., as user device 102. System 200 includes computing device 202, server 204 (e.g., origin server), content database 206, and server 210 (e.g., edge server 110), each of which is communicatively coupled to communication network 208, which may be the Internet or any other suitable network or group of networks. In some examples, system 200 excludes server 204 and/or server 210, and functionality that would otherwise be implemented by server 204 and/or server 210 is instead implemented by other components of system 200, such as computing device 202. In still other examples, server 204 and/or server 210 works in conjunction with computing device 202 to implement certain functionality described herein in a distributed or cooperative manner.

Server 204 includes control circuitry 211 and input/output (hereinafter "I/O") path 212, and control circuitry 211 includes storage 214 and processing circuitry 216. Server 210 includes control circuitry 213 and input/output (hereinafter "I/O") path 215, and control circuitry 213 includes storage 217 (e.g., at least part of an edge cache) and processing circuitry 219. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 220. Control circuitry 211, 213, and/or 218 may be based on any suitable processing circuitry such as processing circuitry 216, 219, and/or 220. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 217, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 217, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 217, 228 or instead of storages 214, 217, 228. In some examples, control circuitry 210, 213 and/or 218 executes instructions for an application stored in memory (e.g., storage 214, 217 and/or 228). Specifically, control circuitry 211, 213 and/or 218 may be instructed by the application to perform the functions discussed herein. In some implementations, any action performed by control circuitry 211, 213 and/or 218 may be based on instructions received from the application. For example, the application may be implemented as software or a set of executable instructions that may be stored in storage 214, 217 and/or 228 and executed by control circuitry 211, 213 and/or 218. In some examples, the application may be a client/server application where only a client application resides on computing device 202, and a server application resides on server 204 and/or server 210.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204 and/or server 210) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204 and/or server 210). For example, the remote server may store the instructions for the application in a storage device. The remote server may process the stored instructions using circuitry (e.g., control circuitry 211 and/or 213) and/or generate displays. Computing device 202 may receive the displays generated by the remote server and may display the content of the displays locally via display 224. This way, the processing of the instructions is performed remotely (e.g., by server 204 and/or 210) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to view an interactive media content item and/or select one or more programming options of the interactive media content item, to control circuitry 211, 213 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204, server 210 and computing device 202 may transmit and receive content and data via I/O path 212, 215 and 220, respectively. For instance, I/O path 212, I/O path 215 and/or I/O path 220 may include a communication port(s) configured to transmit and/or receive (for instance to and/or from content database 206), via communication network 208, content item identifiers, content metadata, natural language queries, and/or other data. Control circuitry 211, 213 and/or 218 may be used to send and receive commands, requests, and other suitable data using I/O paths 212, 215 and/or 220.

FIG. 3 is a flowchart representing an illustrative process 300 for caching content, e.g., for access in a CDN, in accordance with some examples of the disclosure. FIGS. 4A to 4D show, respectively, a table comprising data relating to content items stored in a cache and a diagrammatic representation of various segments of content items stored in a cache, in accordance with some examples of the disclosure. While the example shown in FIGS. 3 and 4A to 4D refers to the use of system 100, as shown in FIGS. 1 and 2, it will be appreciated that the illustrative process shown in FIGS. 3, 4A and 4B, and any of the other following illustrative processes, may be implemented on system 100 and system 200, either alone or in combination with each other, and/or any other appropriately configured system architecture.

At 302, control circuitry, e.g., control circuitry 213, stores at least first and second content items in a cache, which may be located in storage, e.g., storage 217, of edge server 110. However, in other examples, the cache may be distributed over any appropriate number of edge servers. In the example shown in FIG. 1, user 112 accesses a media guidance application to navigate available content. For example, user 112 may search for the term Star Wars: A New Hope, and the media guidance application may return a list 114 of content relating to that term, some content being stored on in the cache on edge server 110, and some being stored on origin server 104. FIG. 4A illustrates some of the content in the cache relating to Star Wars: A New Hope. For example, the cache may comprise various (full) versions of the movie and multiple excerpts from the movie, such as various action scenes from the movie and/or bonus content relating to the movie, which are stored in the cache in addition to the full version(s) of the movie. While the example of the movie Star Wars: A New Hope is used herein, it is to be understood that the cache can contain any appropriate content, and the example of the movie Star Wars: A New Hope, and the various versions and types of excerpts relating to the movie are used for the sake of example and are not limiting to this disclosure.

In some examples, control circuitry, e.g., control circuitry 213, generates and populates a database 402 containing information about the content of the cache. In the example shown in FIG. 4A, a table (or array) is generated comprising information relating to the various content items in the cache relating to movie Star Wars: A New Hope. In this example, the cache contains a full version of a theatrical release of the movie (first content item 404), a full version of a special edition of the movie (second content item 406) and multiple scenes from the movie that are popular with the viewing community (third and fourth content items 408, 410). In some examples, control circuitry 213 accesses content database 106 to determine further information about the content in the cache, such as popularity, user ratings and a quality indicator, which allows the data shown in FIG. 4A to be populated. For example, database 402 comprises information relating to the total runtime of the various content items, segment information, e.g., segment timings, and the quality (SD, HD, 4K, etc.) of the content item stored in the cache.

At 304, control circuitry, e.g., control circuitry 213, determines whether there is common content between the content items stored in the cache, e.g., based on information in database 402 and/or using one or more digital signal processing techniques, such as fingerprinting, which can be used to identify visual characteristics of a content item (e.g., object identification, object tracking, intensity, motion, etc.), irrespective of other characteristics, like quality and bitrate. For example, control circuitry may compare at least two content items in the cache, such as first and second content items to determine whether the content items share common content. In the context of the present disclosure, the term "common content" is used to describe content of a content item that has one or more frames, segments and/or scenes that are the same (or substantially similar) to one or more corresponding frames, segments and/or scenes of another content item, e.g., irrespective of other characteristics, like quality and bitrate.

Figure 4B:
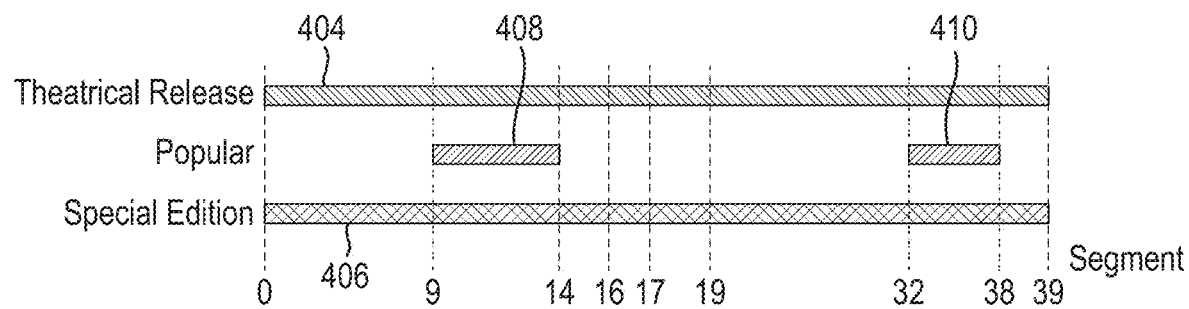
FIG. 4B illustrates a diagrammatic representation of various segments of content items stored in a cache, in accordance with some examples of the disclosure.
Figure 4C:
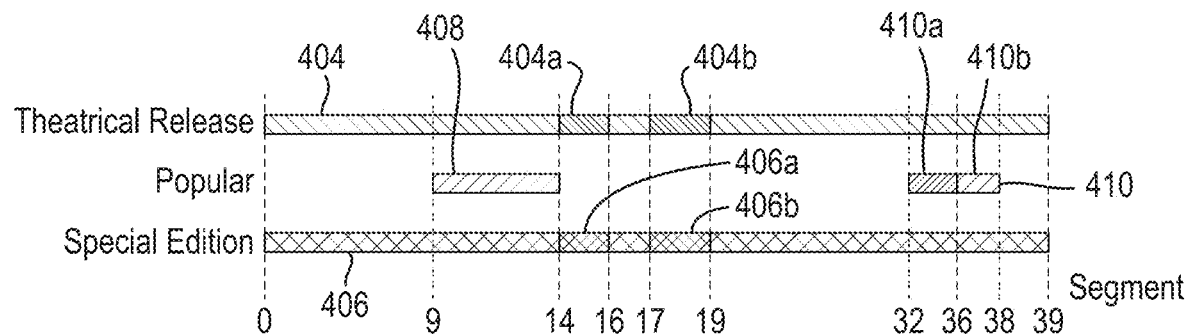
FIG. 4C illustrates a diagrammatic representation of various segments of content items stored in a cache, in accordance with some examples of the disclosure.

FIGS. 4B and 4C illustrate a comparison between the first to fourth content items 404, 406, 408, 410 to determine whether there is common content among them. For example, based on information table 402, control circuitry may determine that the first content item 404 (theatrical release) comprises segments 1-39, the second content item 406 (special edition) comprises segments 1-39, the third content item 408 (classified as popular content) comprises segments 9-14, and the fourth content item 410 (classified as popular content) comprises segments 32-38. Control circuitry may compare the segments of each of the content items 404, 406, 408, 410 to determine whether each segment comprises common content. In the example shown in FIG. 4C, control circuitry determines variation in content between the theatrical release and the special edition of the movie. In particular, the first content item 404 comprises unique portion 404a (segments 14-16) and unique portion 404b (segments 17-19), the second content item 406 comprises unique portion 406a (segments 14-16) and unique portion 406b (segments 17-19), and the fourth content item 410 comprises unique portion 410a (segments 32-35) e.g., due to differences between the two versions as a result of additional and/or different elements of those segments (e.g., changes to camera angles, commentary and/or additional computer generated images). All the remaining content can be classified as common content, e.g., since there is no variation (or variation below a threshold level) between the segments of the various content items 404, 406, 408, 410.

At 306, control circuitry, e.g., control circuitry 213, deletes at least a portion of at least one of the content items 404, 406, 408, 410 stored in the cache, e.g., in response to determining that there is common content between the content items 404, 406, 408, 410 stored in the cache. For example, where two of more content items comprise common content, control circuitry may delete the common content from all but one of the content items. In the example shown in FIG. 4C, each of the first, second and third content items 404, 406, 408 comprise segments 9-14 of the movie. As such, control circuitry may delete segments 9-14 from all but one of the first, second and third content items 404, 406, 408. For example, control circuitry may be configured to select for deletion segments 9-14 of the first content item 404 and segments 9-14 of the third content item 408, leaving segments 9-14 of the second content item 406 stored in the cache. In some examples, the selection of the content item from which the segments are to be deleted is made based on one or more parameters, such as the quality of the respective content items, and/or the frequency at which the respective content items have been accessed, e.g., over a given period. In some examples, the selection of the content item from which the segments are to be deleted is based on one or more service level agreements between various service providers that provide the content items in the cache. For example, in some cases, the first content item 404 and the second content item 406 may be provided by different service providers. As such, the selection of the content item from which the segments are to be deleted, e.g., content item 404 or content item 406, may be made depending on one or more business rules set out between the service providers operating on the CDN.

Figure 4D:
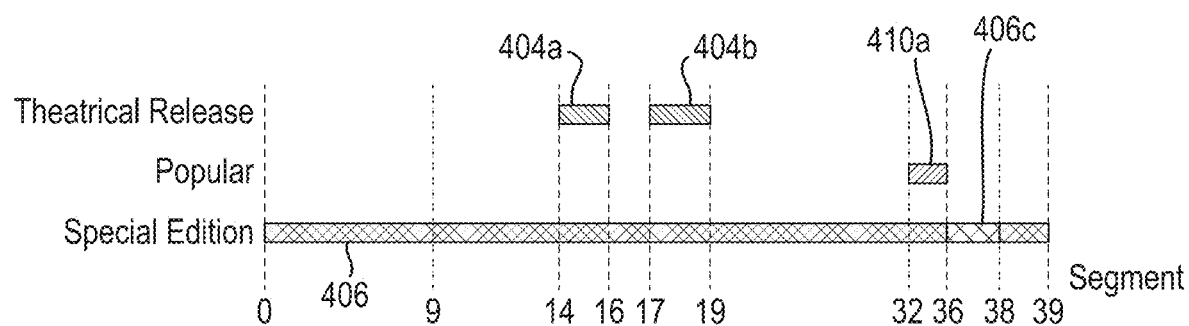
FIG. 4D illustrates a diagrammatic representation of various segments of content items stored in a cache, in accordance with some examples of the disclosure.

In the example shown in FIGS. 4A-D, the selection of the content item from which the segments are to be deleted is based on the quality of the content items. In particular, control circuitry is configured to retain in the cache a highest quality version of the common content, which, in this case, is second content item 406 (e.g., special edition version). For example, control circuitry may be configured to access table 402 (and/or content database 106 of FIG. 1) to determine the quality (and/or any other appropriate parameter) relating to each of the content items. In this manner, control circuitry is able to follow one or more rules to automatically delete content from the cache. FIG. 4D illustrates which portions of the content items 404, 406, 408, and 410 remain in the cache and which portions have been deleted. In particular, FIG. 4D shows that all of the second content item 406, portions 404a and 404b of content item 404, and portion 410a of the fourth content item 410 remain stored in the cache. In this manner, at least one portion of each unique segment of the movie remains stored in the cache. In some examples, control circuitry may be configured to maintain a list, e.g., list 114 of FIG. 1, of the original content stored in the cache, even where some portions have been deleted. In some examples, control circuitry may be configured to update table 402 to mark one or more portions of content as deleted content. Where content has been marked as deleted, control circuitry may provide a link or indicator to where equivalent content may be stored in the cache, or elsewhere, e.g., in another cache. In some examples, control circuitry, of a cache controller (not shown) may manage the deletion of redundant content over multiple edge servers. For example, the cache controller may store and update table 402 (and/or one or more other similar database) comprising data for content items stored over multiple caches/edge servers. In this manner, the optimization of cache storage is not limited to a single cache, and the system and methods disclosed herein may improve the storage of and access to content items over the entire CDN.

At 308, control circuitry, e.g., control circuitry 213, receives a request for a portion of common content. For example, user 112 may navigate list 114 and request popular portion 408, which may relate to topics that are currently trending. In a conventional system, once content has been deleted from a cache, a request for that content would result in a cache miss, and the request being directed to an origin server. The systems and methods disclosed herein are beneficial as they allow for content equivalent to deleted content to be retrieved from the cache, thus avoiding the need to request content from an origin server.

At 310, control circuitry, e.g., control circuitry 213 of FIG. 2, retrieves the requested portion of common content. For example, control circuitry may determine that, upon receiving the request at 308, that the requested portion is no longer in the cache and look for equivalent content still stored in the cache, e.g., using a link or pointer provided above. For example, the request at 308 relates to providing the third content item 408 (i.e., popular portion comprising segments 9-14 of the movie to user 112). As such, control circuitry may determine that the requested popular portion is no longer stored in the cache, and, instead, retrieves an equivalent portion, e.g., segments 9-14, of the second content item 406. In this manner, the storage in the cache is optimized, since it only contains unique content, and access to requested content is improved, since requests to origin server 104 may be reduced, e.g., following specific content being deleted from the cache. In some examples, control circuitry, e.g., control circuitry of a cache controller (not shown), may perform a cache-to-cache fill (or at least try to before requesting content from origin server 104) when the requested content is not in the cache (e.g., not stored on edge server 210).

To put process 300 into context, the content items stored in the cache may be serial programming, e.g., five episodes of a popular TV series, and the common content between content items in the series may be the opening title and/or credits of each episode. In some examples, determination of an opening title and/or credits within an episode may be accomplished through various means, including utilizing information for the "Skip Intro" or "Next Episode" features, which are typically offered by a media guidance application. Such information may be determined from a manifest file associated with an episode and/or by simulating a playback function and utilizing the "Skip Intro" and "Next Episode" functionality. Once the opening titles and/or credits of the episodes have been identified as common content, that common content can be deleted from all but one of the episodes, e.g., by deleting content associated with a particular byte range from all but one of the episodes and/or specific content segments. The common content in the remaining (whole) episode may be linked to each of the episodes from which the common content has been deleted.

The actions or descriptions of FIG. 3 may be used with any other example of this disclosure, e.g., the example described below in relation to FIGS. 5A and 5B. In addition, the actions and descriptions described in relation to FIG. 3 may be done in any suitable alternative orders or in parallel to further the purposes of this disclosure.

Figure 5A:
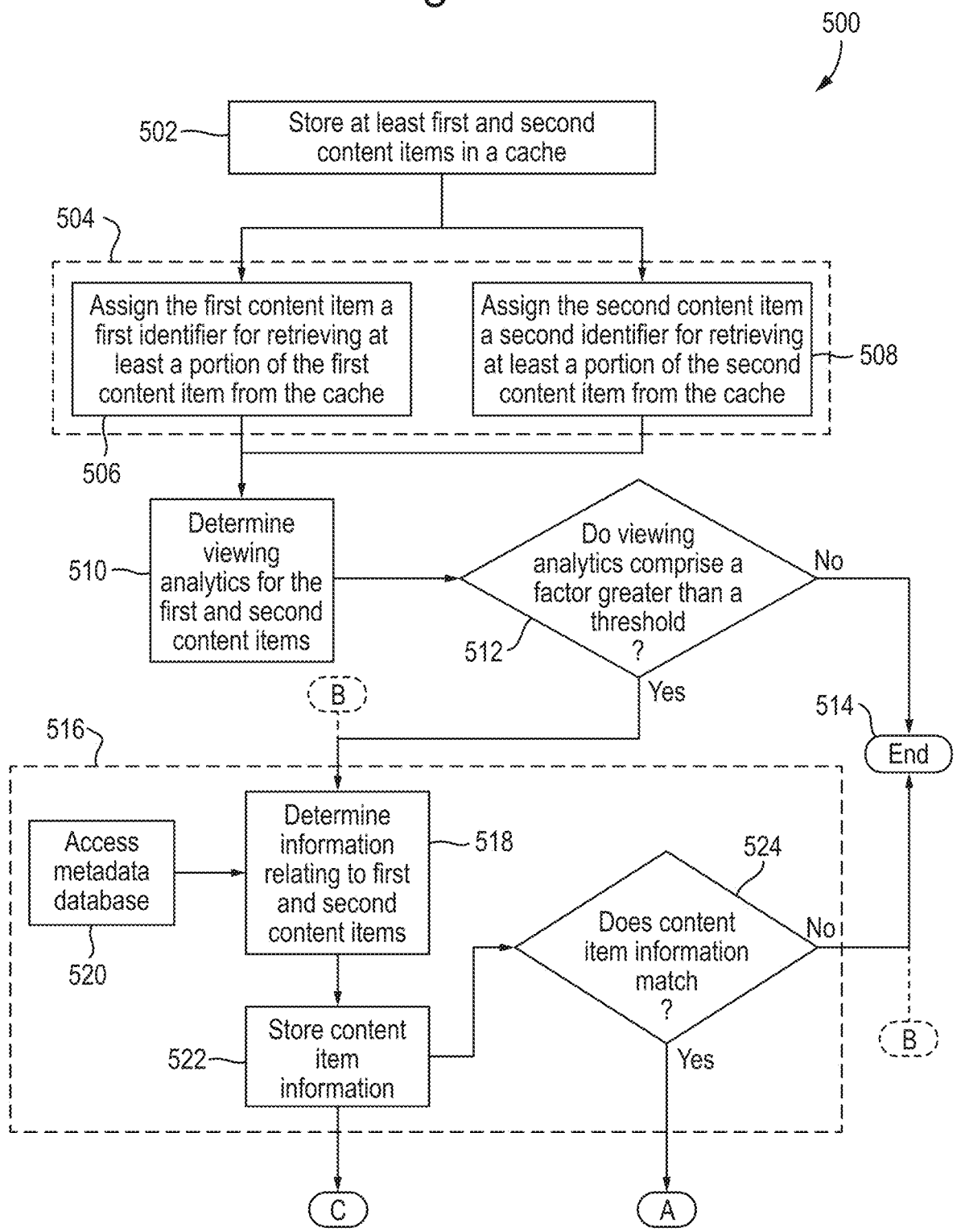
FIG. 5A is a flowchart representing process for managing storage of content items stored in a cache, in accordance with some examples of the disclosure.
Figure 5B:
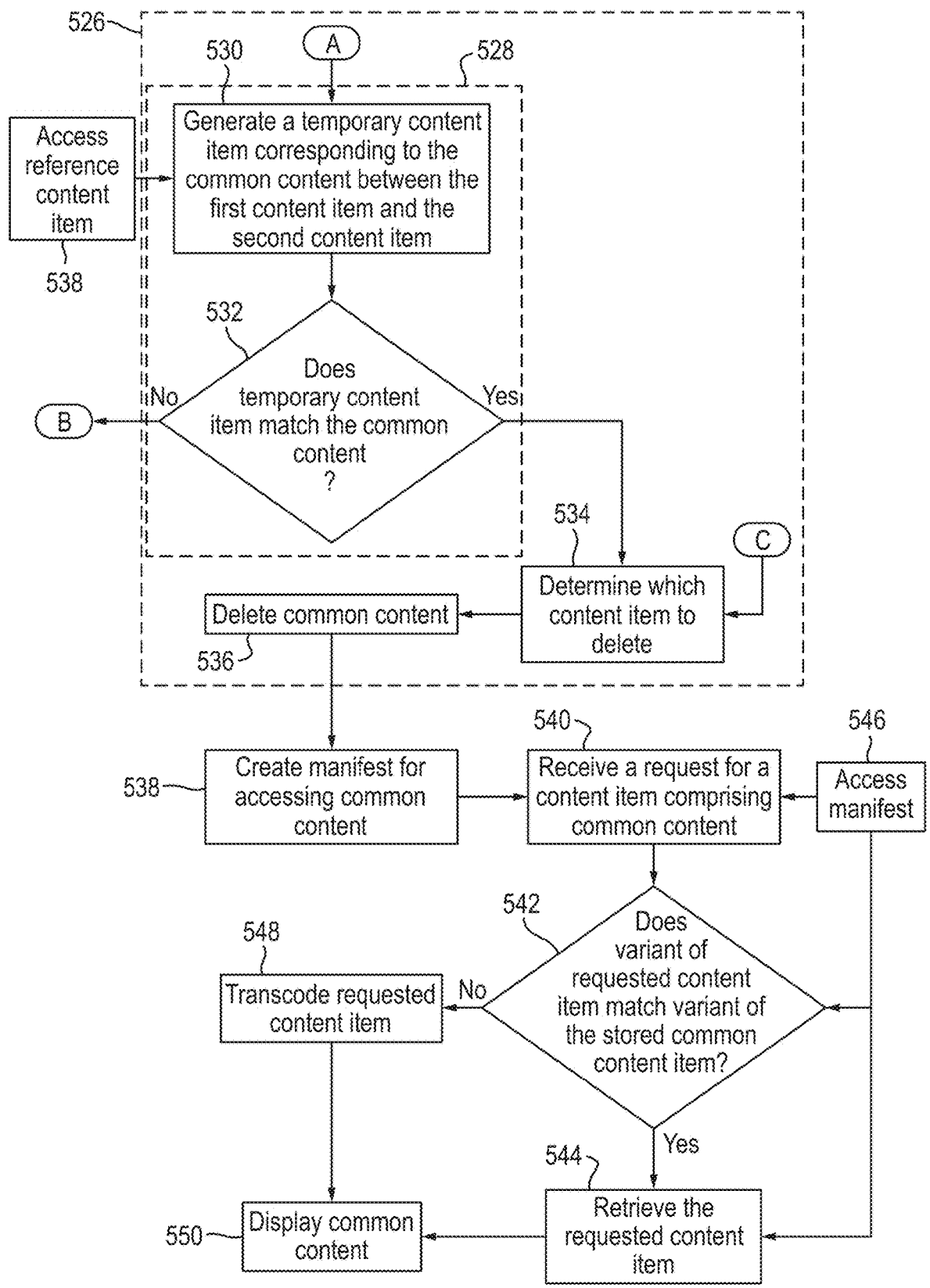
FIG. 5B is a continuation of the flowchart shown in FIG. 5A.

FIGS. 5A and 5B show an illustrative process 500 for optimizing the storage of content in a cache and providing access to that content, e.g., via a CDN, in accordance with some examples of the disclosure. While the example shown in FIGS. 5A and 5B refers to the use of system 100, as shown in FIGS. 1 and 2, it will be appreciated that the illustrative process shown in FIGS. 5A and 5B, and any of the other illustrative processes contained herein, may be implemented on system 100 and system 200, either alone or in combination with each other, and/or any other appropriately configured system architecture.

At 502, control circuitry, e.g., control circuitry 213, stores at least first and second content items in a cache, e.g., in a similar manner to that described under 302. In particular, system 100 may support "cache pre-warming", where popular content is stored on a cache, in expectation of it being requested by one or more users in the near future. In some cases, irrespective of why certain content is stored on a cache, storage of that content may result in at least some content on the cache being duplicated. In the example shown in FIG. 4A, control circuitry has caused four content items 404, 406, 408 and 410 to be stored in the cache of system 100. The present disclosure manages the storage of these content items in the cache, e.g., to allow the cache to store a wider variety of content, thus providing improved access to content, e.g., without a need to request content from an origin server.

At 504, control circuitry, e.g., control circuitry 213, assigns a content identifier to one or more content items stored in the cache. For example, control circuitry may generate and assign a cache key as a unique identifier for a content item in the cache. As discussed above, a cache hit can occur when a user request generates the same cache key as a prior request, and the content item assigned that cache key is in the cache. In the example shown in FIG. 4B, each of content items 404, 406, 408 and 410 are assigned a cache key, such that a user request for a particular content item will result in a cache hit, and that content item will be accessed from server 210, for example. The example illustrated in FIGS. 5A and 5B refers to 506 and 508, in which control circuitry assigns a first content item identifier to a first content item, e.g., content item 406, for retrieving at least a portion of the first content item from the cache, and a second content item identifier to a second content item, e.g., content item 410, for retrieving at least a portion of the second content item from the cache. Although not shown in FIGS. 5A and 5B, a similar process may be performed in regard to one or more further content items, e.g., content item 404 and 408, and/or any other appropriate content item. For the sake of brevity in the continued example, process 500 will be described with reference to the storage of and access to content items 404 and 410.

At 510, control circuitry, e.g., control circuitry 213, determines viewing analytics for the first and second content items 406, 410. For example, determining the viewing analytics may comprise control circuitry determining a frequency at which the one or more of the content items in the cache are requested and/or accessed for viewing at user device 102. Additionally or alternatively, determining the viewing analytics may comprise determining the most-recently accessed content items in the cache, e.g., those content items accessed within the past few hours, days or weeks, for example. Additionally or alternatively, determining the viewing analytics may comprise accessing a profile of user 112 and determining whether one or more of the content items in the cache match a viewing history of the user 112, e.g., in regard to content type, genre, quality, individuals/cast in the content item, for example. In other words, at 510 and 512, control circuitry may determine whether it is likely that user 112 will request one or more of the content items in the cache, e.g., based on the determined viewing analytics and a comparison against one or more set thresholds.

At 512, control circuitry, e.g., control circuitry 213, compares the viewing analytics, e.g., at least one factor of the viewing analytics, such as viewing frequency, popularity, type of content, quality, etc., to a corresponding threshold (e.g., viewing frequency threshold, etc.). For example, control circuitry may set, e.g., based on a user profile, a threshold value for the quality of a content item, e.g., at 4K, based on the typical quality of content that user 112 views. As such, control circuitry may determine that content item 406 has a quality (4K) that matches the typical quality at which user 112 prefers to view content. Similarly, control circuitry may set, e.g., based on a user profile, a threshold value for the popularity of a content item, e.g., at a certain number of views, or a last accessed time, based on the typical popularity of content that user 112 views. As such, control circuitry may determine that content item 410 has a popularity (e.g., 1500 views) that matches the typical popularity of content the user 112 views. In some examples, content item metadata, such as content item data relating to quality and popularity (e.g., trending data), may be accessed from content database 106, table 402, and/or any other appropriate location. At 512, when at least one factor relating to the viewing analytics is below a corresponding threshold, process 500 moves to 514, where process 500 ends. At 512, when at least one factor relating to the viewing analytics is below a corresponding threshold, process 500 moves to 516. In some examples, 510 and 512 may be implemented so as to check whether it is worthwhile, e.g., from a computational standpoint, to continue in performing optimization of cache storage and access of content items from the cache.

At 516, control circuitry, e.g., control circuitry 213, determines whether there is common content between the first content item and the second content item, e.g., in a similar manner to that described under 304 of process 300. In the example shown in FIG. 5A, 516 comprises 518, 520, 522 and 524. In some examples, process 500 may proceed to 516 when, e.g., only when, the storage capacity of the cache reaches, e.g., within a threshold level, a certain capacity, e.g., 80 percent capacity. As such, in some examples, the storage optimization may not be carried out by default, and the computational power taken to carry out storage optimization may be reserved for when, e.g., only when, the storage in the cache is approaching an upper limit. In some examples, such storage optimization may be offered as a service by a service provider.

At 518, control circuitry, e.g., control circuitry 213, determines information relating to first and second content items. For example, control circuitry may access metadata database, at 520, to determine information, such as field, frame, segment and/or scene timing information, i-frame information, quality information, information relating to modification from an original version (e.g., additional content added by a user, such as commentary), and/or any other appropriate information relating to a content item, such as cast/production information.

At 522, control circuitry, e.g., control circuitry 213, stores the content item information. In the example shown in FIG. 4A, control circuitry populates a database (e.g., table 402) with a description of each content item, and timing (e.g., runtime), segment number and quality information relating to each content item. For example, table 402 shows content item 406 as being an unmodified, high quality (4K) version of a special edition of the movie, having a runtime of 0-121 minutes, comprising segments 1-39, and content item 410 as being a partially modified, high quality (HD) version of a popular portion of the movie, having a runtime of 98-119 minutes, comprising segments 32-38. The diagram shown in FIG. 4B illustrates the content items stored in the cache.

At 524, control circuitry, e.g., control circuitry 213, determines whether there is common content between the content items stored in the cache, e.g., whether there is a match between at least some of content item 406 and at least some of content item 410. For example, control circuitry determines that there is a partial match between content items 406 and 410, in that both content items comprise segments 32-38 of the movie. Additionally or alternatively, control circuitry may be configured to determine whether each content item comprises unique content, e.g., content item portions 406a, 406b and 410a. For example, control circuitry may determine that, while segments 32-38 of content item 410 are present in content item 406, segments 32-35 of content item 410 comprise modifications from the version represented by content item 406, e.g., based on metadata accessed from content database 106 and/or any other appropriate source. As such, control circuitry may determine a positive match between segments 36-38 of content item 406 and content item 410. In other words, control circuitry may determine that there is no difference (or a difference less than a threshold level) between segments 32-35 of the content item 406 and 410, i.e., that the cache contains duplicated (or substantially duplicated) content. In such a case, process 500 moves to 526 (see arrow A). When control circuitry determines that there is not a match between the content item information, process 500 moves to 514 and ends, since there is not any common (e.g., duplicated) content between the content items in the cache. In some examples, when control circuitry determines match between content item information, such information may be shared, e.g., by virtue of a cache controller (not shown), with one or more other servers and/or caches, e.g., so that storage of content items may be optimized across some of, or the entire, CDN.

At 526, control circuitry, e.g., control circuitry 213, deletes at least a portion of at least one of the content items stored in the cache, e.g., in a manner similar to that described in 306 of process 300. In the example shown in FIGS. 5A and 5B, 526 comprises 528, 530, 532, 534 and 536. For example, at 526, control circuitry may cause the common content to be deleted from one of content item 406 and content item 410.

At 528, in response to determining that there is (or potentially is) common content in the cache, control circuitry checks whether the (potentially) common content can be deleted from the cache, e.g., without losing unique content from the cache. In some examples, a validation service may be requested e.g., by control circuitry 213, to check whether a portion of a content item marked for deletion, e.g., at 516, represents the correct portion of content. For example, control circuitry 213 may request control circuitry 211 to perform a validation for the to-be-deleted content in the cache. Specifically, at 530, control circuitry 211 generates, based on a reference content item stored in origin cache 104, a temporary content item corresponding to the common content stored in the cache, e.g., the content of segments 36-38 of content item 406 and content item 410. At 532, control circuitry 211 compares, e.g., by virtue of a fingerprint, segments 36-38 of the temporary content item to the common content between content items 406 and 410. When the temporary content item, e.g., segments 36-38 of the temporary content item, does not match the common content, the validation service may indicate that the common content should not be deleted from the cache, since it may in fact comprise some unique content. For example, when a fingerprint of segments 36-38 of the temporary content item does not correlate with a fingerprint of the common content, e.g., when the correlation is below a correlation threshold, process 500 moves to either 514 or 518, depending on a system setting (see arrow B). Conversely, when a fingerprint of segments 36-38 of the temporary content item does correlate with a fingerprint of the common content, e.g., when the correlation is equal to or greater than a correlation threshold, process 500 moves to 536, since the validation service has confirmed that the common content is in fact duplicated content and its deletion will not cause unique content to be lost from the cache. In some examples, the temporary content item can be deleted once the validation check has been carried out.

At 534, in response to determining that deleting the common content will not cause a loss of unique content, control circuitry, e.g., control circuitry 213, determines which of content items 406 and 410 to delete, at least in part. For example, control circuitry may determine one or more settings on which deletion of content from the cache is based. For example, a service provider may set one or more rules which determine a priority on which content is to be deleted, such as quality, popularity, size, etc. In the example shown in FIGS. 4A to 4D, deletion of a content item is based on the quality of the content items that share the common content, the goal of the service provider being to retain the highest quality version of the content item in the cache. For example, control circuitry determines which of content items 406 and 410 has a higher quality, e.g., by accessing information that was stored at 522 (see arrow C). In this case, content item 406 is stored in 4K quality and content item 410 is stored in HD quality. As such, control circuitry determines that the common content is to be deleted from content item 410. However, in other examples, a service provider may set any appropriate rule or rules to govern the deletion of a content item, for example, based on one or more user preferences stored in a user profile and/or one or more agreements with a service provider.

At 536, control circuitry, e.g., control circuitry 213, deletes the common content from content item 410. Specifically, control circuitry causes segments 36 to 38 of content item 410 to be deleted from the cache. In this manner, storage of content in the cache is optimised. For example, deletion of segments 36 to 38 of content item 410 may free up space in the cache for the storage of new content, e.g., for implementing cache pre-warming strategies. The deletion of segments 36 to 38 of content item 410 is depicted in FIGS. 4C and 4D, where common portion 410B of content item 410 is deleted from the cache, and unique portion 410A of content item 410 is retained in the cache.

At 538, control circuitry, e.g., control circuitry 213, creates a manifest for accessing the common content. For example, the manifest may contain appropriate metadata needed for user device 102 to issue a request for the common content, e.g., to server 210, in order to decode and render the common content at user device 102. In some examples, the metadata may comprise at least a portion of, or a reference to, a content item identifier for retrieving at least a portion of a content item, such as the content item identifiers described at 506, where content item 406 was assigned a first content item identifier, and at 508 where content item 410 was assigned a second content item identifier. Following the above example, where portion 410a was deleted from the cache, control circuitry may be configured to reassign the second content identifier for retrieving segments 36 to 38 of content item 410 to content item 406. In other words, metadata for retrieving segments 36 to 38 of content item 410 may be linked to content item 406, such that, following a request, e.g., at user device 102, for portion 410b, control circuitry can retrieve content equivalent to deleted portion 410b from content item 406.

At 540, control circuitry, e.g., control circuitry 213, receives a request for content item 410. For example, user 112 may be browsing list 114 for popular content related to the movie, and select content. In response to receiving the request, control circuitry may determine whether content item 410 comprises common content, e.g., based on information stored in table 402 and/or in the manifest created at 538.

At 542, control circuitry, e.g., control circuitry 213, determines whether the variant of the requested content item, e.g., content item 410, matches, e.g., within a predetermined threshold, the common content, e.g., which is stored as part of content item 406. For example, control circuitry may determine whether the quality of the requested content item, e.g., content item 410, matches, e.g., within a predetermined quality threshold, the common content. Control circuitry may determine the quality (and/or any other appropriate variant parameter, such as language) by accessing the content item information stored at 522 or by accessing the manifest at 546. In the example shown in FIG. 4A, content item 406 is stored in the cache in 4K quality and content item 410 is stored in HD quality. As such, at 542, control circuitry determines that the common content item 406 has a greater quality than content item 410, and process 500 moves to 544, since control circuitry may be set to display content of the highest available quality. When the quality of the requested content item is greater than the stored common content, process 500 moves to 548.

At 544, control circuitry, e.g., control circuitry 213, retrieves the requested content item, e.g., using information stored in the manifest. For example, the manifest, which is accessed at 546, may contain metadata that is needed by user device 102 to issue a GET request (or similar) for segments 32 to 35, e.g., portion 410a, to be retrieved from content item 410 stored in the cache, and segments 36 to 38, e.g., portion 406c which is equivalent to deleted portion 410b, to be retrieved from content item 406 stored in the cache.

At 548, in response to a request for the content item in a variant (e.g., quality) that is different from the variant of the common content (which is contrary to the example illustrated in FIGS. 4A to 4C), control circuitry, e.g., control circuitry 213, may redirect the request for the common content, e.g., deleted segments 36 to 38 of content item 410, to a server that serves just-in-time transcoded content. For example, control circuitry may redirect the request for the common content to a server that serves just-in-time transcoded content when the requested variant is higher in quality than the quality of the variant of the common content stored in the cache.

In this manner, even when a user requests a variant of a content item that is not stored in the cache, it can be delivered to user device 102, without requiring additional storage in the cache, or requesting the content from an origin server.

At 550, control circuitry, e.g., control circuitry 213, causes the requested content item to be displayed on user device 102. Importantly, user device 102 may issue a single request for a content item, and edge server 210 may coordinate its retrieval from two different locations, either from at least two content items stored in the cache, or a content item stored in the cache and a server that serves transcoded content.

The actions or descriptions of FIGS. 5A and 5B may be used with any other example of this disclosure. In addition, the actions and descriptions described in relation to FIGS. 5A and 5B may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for caching content items, the method comprising:
    storing at least first and second content items in a cache;
    determining a quality of each of the first and second content items;
    determining whether there is common content between the first content item and the second content item;
    in response to determining that there is common content between the first content item and the second content item, and that the quality of the first content item is less than the quality of the second content item, deleting at least a portion of the first content item;
    receiving a request for the common content; and
    in response to receiving the request for the common content, retrieving the common content from the second content item.

2. The method of claim 1, wherein the first content item has a first identifier for retrieving at least a portion of the first content item from the cache and the second content item has a second identifier for retrieving at least a portion of the second content item from the cache, the method comprising:
    in response to deleting at least a portion of the first content item:
        assigning the first identifier to the second content item for retrieving the common content from the second content item.

3. The method of claim 1, wherein determining whether there is common content between the first content item and the second content item comprises:
    determining content item information relating to the first and second content items;
    storing the content item information in a database; and
    comparing content item information for the first content item to content item information for the second content item.

4. The method of claim 3, the method comprising:
    determining viewing analytics for the first and second content items; and
    in response to determining that the viewing analytics for the first and second content items comprise a factor that is greater than a threshold, determining the content item information relating to the first and second content items.

5. The method of claim 4, wherein determining the viewing analytics comprises:
    determining a user rating of a content item; or
    determining when the content item was last accessed.

6. The method of claim 3, wherein the content item information comprises content item metadata or one or more fingerprints of the content item.

7. The method of claim 1, wherein the common content comprises multiple segments distributed through each of the first and second content items.

8. The method of claim 1, the method comprising:
    creating a manifest for retrieving the common content from the second content item.

9. The method of claim 1, the method comprising:
    in response to determining that there is common content between the first content item and the second content item, generating a temporary content item corresponding to the common content between the first content item and the second content item;
    comparing the temporary content item to the first content item; and
    in response to determining that the temporary content item matches the common content of the first content item, deleting the common content from the first content item.

10. A system for caching content items, the system comprising control circuitry configured to:
    store at least first and second content items in a cache;
    determine a quality of each of the first and second content items;
    determine whether there is common content between the first content item and the second content item;
    in response to determining that there is common content between the first content item and the second content item, and that the quality of the first content item is less than the quality of the second content item, delete at least a portion of the first content item;
    receive a request for the common content; and
    in response to receiving the request for the common content, retrieve the common content from the second content item.

11. The system of claim 10, wherein the first content item has a first identifier for retrieving at least a portion of the first content item from the cache and the second content item has a second identifier for retrieving at least a portion of the second content item from the cache, the control circuitry being configured to:
    in response to deleting at least a portion of the first content item:

assign the first identifier to the second content item for retrieving the common content from the second content item.

12. The system of claim 10, wherein, when determining whether there is common content between the first content item and the second content item, control circuitry is configured to:
   determine content item information relating to the first and second content items;
   store the content item information in a database; and
   compare content item information for the first content item to content item information for the second content item.

13. The system of claim 12, the control circuitry being configured to:
   determine viewing analytics for the first and second content items; and
   in response to determining that the viewing analytics for the first and second content items comprise a factor that is greater than a threshold, determine the content item information relating to the first and second content items.

14. The system of claim 13, wherein, when determining the viewing analytics, control circuitry is configured to:
   determine a user rating of a content item; or
   determine when the content item was last accessed.

15. The system of claim 12, wherein the content item information comprises content item metadata or one or more fingerprints of the content item.

16. The system of claim 10, wherein the common content comprises multiple segments distributed through each of the first and second content items.

17. The system of claim 10, the control circuitry being configured to:
   create a manifest for retrieving the common content from the second content item.

18. The system of claim 10, the control circuitry being configured to:
   in response to determining that there is common content between the first content item and the second content item, generate a temporary content item corresponding to the common content between the first content item and the second content item;
   compare the temporary content item to the first content item; and
   in response to determining that the temporary content item matches the common content of the first content item, delete the common content from the first content item.

* * * * *